United States Patent [19]

Zerfass et al.

[11] Patent Number: 4,635,948
[45] Date of Patent: Jan. 13, 1987

[54] RELEASE COATING FOR GASKETS AND MANUFACTURING METHOD

[75] Inventors: Hans-Rainer Zerfass; Klaus-Peter Majewski, both of Burscheid; Franz-Josef Giesen, Odenthal, all of Fed. Rep. of Germany

[73] Assignee: Goetze AG, Burscheid, Fed. Rep. of Germany

[21] Appl. No.: 830,688

[22] Filed: Feb. 18, 1986

[30] Foreign Application Priority Data

Feb. 18, 1985 [DE] Fed. Rep. of Germany ....... 3505562

[51] Int. Cl.$^4$ ............................................. F16J 15/10
[52] U.S. Cl. ............................... 277/235 B; 277/233; 277/DIG. 6
[58] Field of Search ............... 277/227, 229, 233, 234, 277/235 R, 235 A, 235 B, DIG. 6

[56] References Cited

U.S. PATENT DOCUMENTS

| | | | |
|---|---|---|---|
| 2,170,363 | 8/1939 | Balfe | 277/DIG. 6 X |
| 2,330,106 | 9/1943 | Bernstein et al. | 277/233 X |
| 2,951,721 | 9/1960 | Asp | 277/233 |
| 3,108,018 | 10/1963 | Lewis | 277/DIG. 6 X |
| 3,970,322 | 7/1976 | Stecher et al. | 277/235 A |

*Primary Examiner*—Robert S. Ward
*Attorney, Agent, or Firm*—Spencer & Frank

[57] ABSTRACT

A soft material, flat gasket having a release coating adhered thereto prepared by a process which includes: perparing a release coating composition which is a suspension including: from 69.5 to 93 parts by weight of an oil having a viscosity in excess of 100 m Pa×s and a fire point in excess of 230° C., which oil is one of a mineral oil, a nonreactive silicone oil, and a mixture thereof; from 5 to 20 parts by weight of a polytetrafluoroethylene powder which has a particle size of less than 5μ; from 0.5 to 10 parts by weight of an aqueous latex; and from 0.5 to 2 parts by weight of a wetting agent; and applying the release coating composition by coating at least a predetermined portion of at least one surface of the soft material, flat gasket therewith. In spite of the notoriously poor bonding capability of PTFE materials, the release coatings produced in this manner exhibit unexpectedly good adhesion to the gasket so that the gaskets do not release PTFE and give off their color when handled, do not loose their non-stick properties when stored over long periods of time, and can be stacked harmlessly on top of one another immediately after application of the coating.

13 Claims, No Drawings

RELEASE COATING FOR GASKETS AND MANUFACTURING METHOD

BACKGROUND OF THE INVENTION

1. Field of the Invention

The present invention relates to a flat gasket made from a soft material, and in particular to cylinder head gaskets, exhaust flange seals or ancillary seals for internal-combustion engines, which are coated wholly or in part, on one or both sides, with a material which prevents their adhesion to the surfaces to be sealed in use.

2. Discussion of the Prior Art

A drawback of, in particular, soft material, flat gaskets for internal-combustion engines, is the adhesion of the gaskets to the sealed surfaces which develops during operation of the engine, because of the applied sealing pressure and the temperature stresses. When an internal-combustion engine requires repairs necessitating the removal of a gasket, the gasket is generally destroyed, because parts thereof continue to adhere to the flange surfaces which the gaskets were intended to seal. The adhering fragments must then be carefully removed from the flange surfaces and, generally, the old gasket cannot be reused.

It is therefore customary in the sealing art to avoid such damage to the gasket by coating the gaskets, wholly or in part, on one or both sides, with release coatings which, preferably, adhere to the gasket, but counteract adhesion of the gasket to the surface to be sealed. Silicone resins, polysiloxanes, polytetrafluoroethylene and other polymeric substances having a low coefficient of friction are disclosed as useful gasket coating materials in U.S. Pat. No. 4,223,897. However, coating materials having a low coefficient of friction generally do not adhere well to the gasket. Thus, according to the reference, it is necessary to have either a zone free of impregnating agent in the surface region of the soft material fiber mat of the impregnated gasket so that the coating material can anchor itself in the exposed fibers, or the surfaces of the impregnated gaskets to be coated must be slightly dissolved and softened, after the impregnating agent has been cross-linked, so that a good bond develops between the impregnated gasket and the coating material. The reference's teachings thus require relatively large amounts of these costly coating materials and additional process steps, however, so that gaskets produced in this manner are expensive; too expensive for mass produced articles.

It is also known in the sealing art to use graphite in a powdered to a fine-grained particulate form as a material to counteract sticking. For this purpose, graphite has been previously used in a suspension with aqueous latex. Too high a percentage of latex in the coating, however, renders the non-stick properties of the graphite ineffective, the coated gaskets stick to the sealed surfaces of the internal-combustion engine and the desired release effect is not realized. Although this drawback can be overcome by modifying the composition to limit the amount of latex to a smaller percentage, this tradeoff tends to result in the graphite no longer being sufficiently bonded to the gasket surfaces being coated, graphite is released and the gaskets give off color. This makes the coated gaskets difficult to handle and the loss of graphite corresponds to a diminishing of the sought-after non-stick properties, especially noticeable after longer periods of storage.

SUMMARY OF THE INVENTION

It is therefore an object of the present invention to provide a release coating for a soft material, flat gasket, particularly for impregnated gaskets useful in internal-combustion engines, wherein the coating adheres well to the gasket, has good non-stick, i.e., release, properties with respect to the surfaces to be sealed by the gasket in use, is easily handled and, at the same time, can be manufactured easily and economically.

This is accomplished according to the present invention by providing a soft material, flat gasket having a release coating adhered thereto prepared by a process which includes preparing a release coating composition which is a suspension including from 69.5 to 93 parts by weight of an oil having a viscosity in excess of 100 m Pa×s and a fire point in excess of 230° C., which oil is one of a mineral oil, a non-reactive silicone oil, and a mixture thereof; from 5 to 20 parts by weight of a polytetrafluoroethylene powder which has a particle size of less than $5\mu$; from 0.5 to 10 parts by weight of an aqueous latex; and from 0.5 to 2 parts by weight of a wetting agent; and applying the release coating composition by coating at least a predetermined portion of at least one surface of the soft material, flat gasket therewith. The release coating composition may further include up to 1 part by weight of an anti-settling agent which is a silicate material, such as bentonite. The invention further contemplates a release coating composition, a process for preparing a gasket having a release coating adhering thereto, and a coated gasket.

DESCRIPTION OF THE PREFERRED EMBODIMENTS

In spite of the notoriously poor bonding capability of polytetrafluoroethylene (PTFE) materials, the adhersion of the release coating compositions according to the present invention to gaskets, especially to impregnated gaskets, is surprisingly good. The coated gaskets have the sought-after good non-stick, i.e., release, prorperties with respect to the surfaces to be sealed by the coated gasket in use, the non-stick properties being approximately as good as those for gaskets freshly coated with the prior art graphite-latex suspensions. Also surprising is the fact that the coated gaskets can be stacked harmlessly on top of one another immediately after application of the release coating without any significant transfer of matter and without sticking together, and they lose neither color nor their non-stick properties after longer periods of storage. The bond between the PTFE particles and the other ingredients of the coating composition and the gasket is thus believed to be unexpectedly good, a result which is even more surprising in view of the low latex percentage in the coating composition. The high oil content, under the influence of the wetting agent, appears to enhance bonding between the PTFE particles and the latex in the coating composition. Also apparently enhanced is the bonding of the PTFE particles to the fibers of the soft material fiber mat, the binders and, possibly, the cross-linked impregnating agent contained in the fiber mat, since, after the coating composition has been absorbed by the gasket, which occurs rapidly, a good bond results.

Useful aqueous latex materials include those having natural or synthetic origins, synthetic latexes being preferred. Examples of synthetic latexes include polystyrene, styrene butadiene rubber (SBR), nitrile butadiene rubber (NBR), neoprene and polyvinyl chloride. NBR rubbers are most preferred.

An otpimum thickness for the non-stick coating is attained when the coating composition is applied in a weight per unit area of 200 g/m$^2$. The cut edges of the gasket may also be coated and, preferably, are coated.

It is advantageous for the coating composition to be storable for long periods of time without annoying settling or separation of components. Setting or separation may be mitigated and, in some instances, substantially prevented by including in the coating composition an effective amount and, in any event, up to 1 part by weight of an anti-settling agent which is preferably a silicate material, for example, bentonite. Inclusion of anti-settling agent also imparts greater heat resistance to the coatings. In order to produce non-stick coatings for gaskets subject to high thermal stresses, such as exhaust flange gaskets, progressively greater amounts of silicone oil are used in place of the less expensive mineral oil in the coating composition suspension. The silicone oil has a viscosity greater than 100 m Pa$\times$s and is preferably a non-reactive silicone oil. Temperature resistance of the gasket thus increases as the percentage of silicone oil used increases. When mineral oil is used, it is preferably a high viscosity mineral oil having a viscosity greater than 100 m Pa$\times$s and a fire point in excess of 230° C.

Within the scope of the present invention, particulates other than PTFE powder, but having comparatively low coefficients of friction, may be employed in the coating composition suspension. Such alternate powdery particulates include, preferably, organic polymers.

Thus, the present invention provides release coatings for soft material, flat gaskets which have good release properties with respect to surfaces they contact and adhere well to the gasket. The good adhesive bonding of the coating to the gasket advantageously facilitates handling of the coated gaskets which can be stacked harmlessly on top of one another immediately after application of the coating composition suspension without sticking together. The good adhesive bonding of the coating to the gaskets also results in retention of the PTFE and, hence, of the color of the coating, unlike prior art graphite coatings. Also retained are the desired non-stick properties, which persist even after long periods of storage and use. The preferred comparatively low latex percentages employed enable the non-stick properties of the coated gaskets to persist, the coated gaskets being only minimally influenced by storage thereof or by aging of the latex component under thermal stresses. Moreover, the release coatings can be produced economically and simply, since the starting materials employed are relatively cost-effective and the suspensions, once mixed, can be kept for long periods of time and can be serially used in mass production.

Particularly good results were realized, for example, with the following coating composition suspension:
  77.5 parts by weight of a mineral oil having a fire point of about of 230° C.;
  10 parts by weight of a PTFE powder having a particle size of less than 5$\mu$;
  1 part by weight of an aqueous latex composed of 40% by weight of an NBR latex in water;
  1 part by weight of a wetting agent which is a cationic surfactant;
  0.5 parts by weight of an anti-settling agent which is bentonite.

It will be understood that the above description of the present invention is susceptible to various modifications, changes and adaptations, and the same are intended to be comprehended within the meaning and range of equivalents of the appended claims.

What is claimed is:

1. A soft material, flat gasket having a release coating adhered thereto prepared by a process comprising:
  preparing a release coating composition which is a suspension including:
    from 69.5 to 93 parts by weight of an oil having a viscosity in excess of 100 m Pa$\times$s and a fire point in excess of 230° C., which oil is one of a mineral oil, a non-reactive silicone oil, and a mixture thereof;
    from 5 to 20 parts by weight of a polytetrafluoroethylene powder having a particle size of less than 5$\mu$;
    from 0.5 to 10 parts by weight of an aqueous latex; and
    from 0.5 to 2 parts by weight of a wetting agent; and
  applying the release coating composition by coating at least a predetermined portion of at least one surface of the soft material, flat gasket therewith.

2. The gasket according to claim 1, wherein up to 200 grams of release coating composition is applied per square meter of gasket surface.

3. The gasket according to claim 1, wherein the gasket has cut edges and wherein the release coating composition is further applied to coat the cut edges.

4. The gasket according to claim 1, wherein the release coating composition further comprises an anti-settling agent which is a silicate material and is present in an amount ranging from an amount effective to counteract settling up to 1 part by weight.

5. The gasket according to claim 4, wherein the release coating composition consists essentially of:
  77.5 parts by weight of a mineral oil;
  10 parts by weight of a polytetrafluoroethylene powder;
  1 part by weight of an aqueous latex composed of 40% by weight of NBR latex in water;
  1 part by weight of a wetting agent which is a cationic surfactant; and
  0.5 part by weight of an anti-settling agent which is bentonite.

6. A release coating composition for application thereof by coating onto at least a portion of at least one surface of a gasket whereby adhesion of the gasket so coated with a surface to be sealed is prevented, the release coating composition, comprising:
  from 69.5 to 93 parts by weight of an oil having a viscosity in excess of 100 m Pa$\times$s and a fire point in excess of 230° C., which oil is one of a mineral oil, a non-reactive silicone oil and a mixture thereof;
  from 5 to 20 parts by weight of a polytetrafluoroethylene powder having a particle size of les than 5$\mu$;
  from 0.5 to 10 parts by weight of an aqueous latex; and
  from 0.5 to 2 parts by weight of a wetting agent.

7. The release coating composition according to claim 6, further comprising an anti-settling agent which is a silicate material and is present in an amount ranging from an amount effective to counteract settling up to 1 part by weight.

8. The release coating composition according to claim 7, wherein the release coating composition consists essentially of:
- 77.5 parts by weight of a mineral oil;
- 10 parts by weight of a polytetrafluoroethylene powder;
- 1 part by weight of an aqueous latex composed of 40% by weight of NBR latex in water;
- 1 part by weight of a wetting agent which is a cationic surfactant; and
- 0.5 part by weight of an anti-settling agent which is bentonite.

9. A coated gasket comprising a soft material, flat gasket and a release coating adhered to at least a part of at least one side of the soft material, flat gasket, the release coating being constituted by a material formed by applying to the soft material, flat gasket a suspension comprised of:
- from 69.5 to 93 parts by weight of an oil having a viscosity in excess of 100 m Pa×s and a fire point in excess of 230° C., which oil is one of a mineral oil, a non-reactive silicone oil and a mixture thereof;
- from 5 to 20 parts by weight of a polytetrafluoroethylene powder having a particle size of less than 5μ;
- from 0.5 to 10 parts by weight of an aqueous latex; and
- from 0.5 to 2 parts by weight of a wetting agent.

10. The coated gasket according to claim 9, wherein up to 200 grams of the suspension is applied per square meter of gasket surface.

11. The coated gasket according to claim 9, wherein the soft material, flat gasket has cut edges and wherein the suspension is further applied to coat the cut edges.

12. The coated gasket according to claim 9, wherein the suspension further comprises an anti-settling agent which is a silicate material and is present in an amount ranging from an amount effective to counteract settling up to 1 part by weight.

13. The coated gasket according to claim 12, wherein the suspension consists essentially of:
- 77.5 parts by weight of a mineral oil;
- 10 parts by weight of a polytetrafluoroethylene powder;
- 1 part by weight of an aqueous latex composed of 40% by weight of NBR latex in water;
- 1 part by weight of a wetting agent which is a cationic surfactant; and
- 0.5 part by weight of an anti-settling agent which is bentonite.

* * * * *